July 27, 1965 H. A. KELLER 3,196,672
MEANS FOR MEASURING STIFFNESS OF LUMBER
Filed July 24, 1961 7 Sheets-Sheet 1
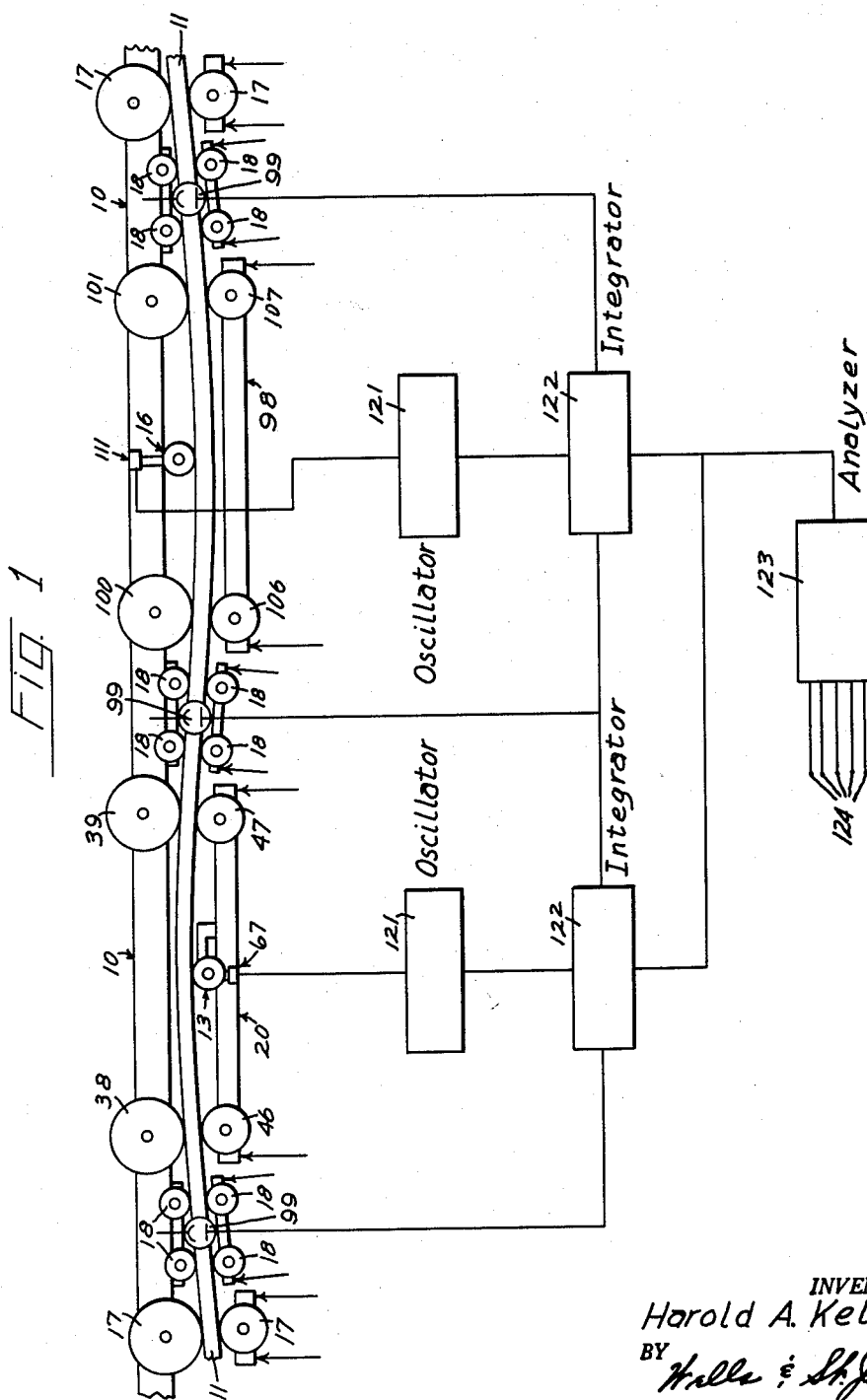
INVENTOR.
Harold A. Keller
BY
Attys.

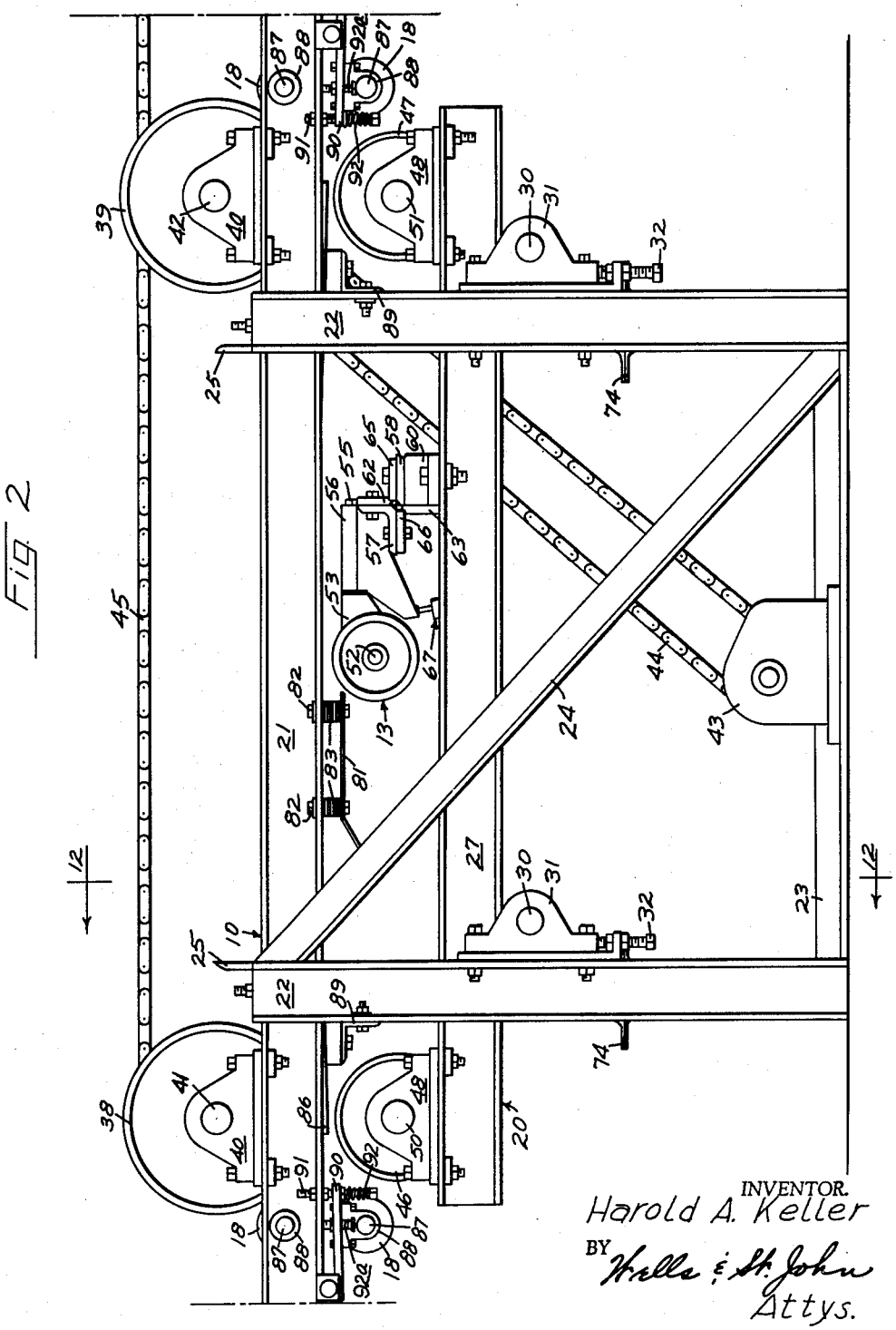

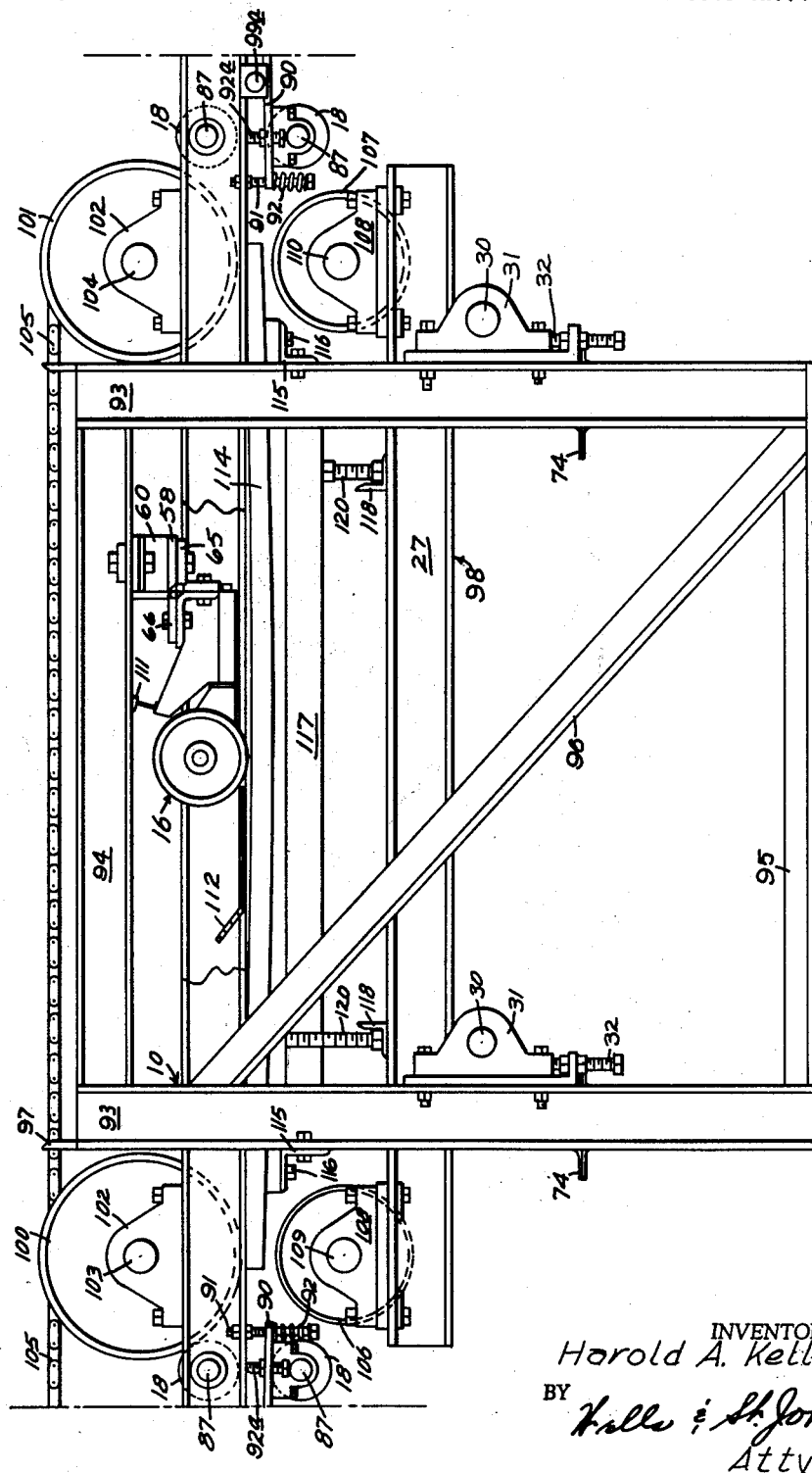

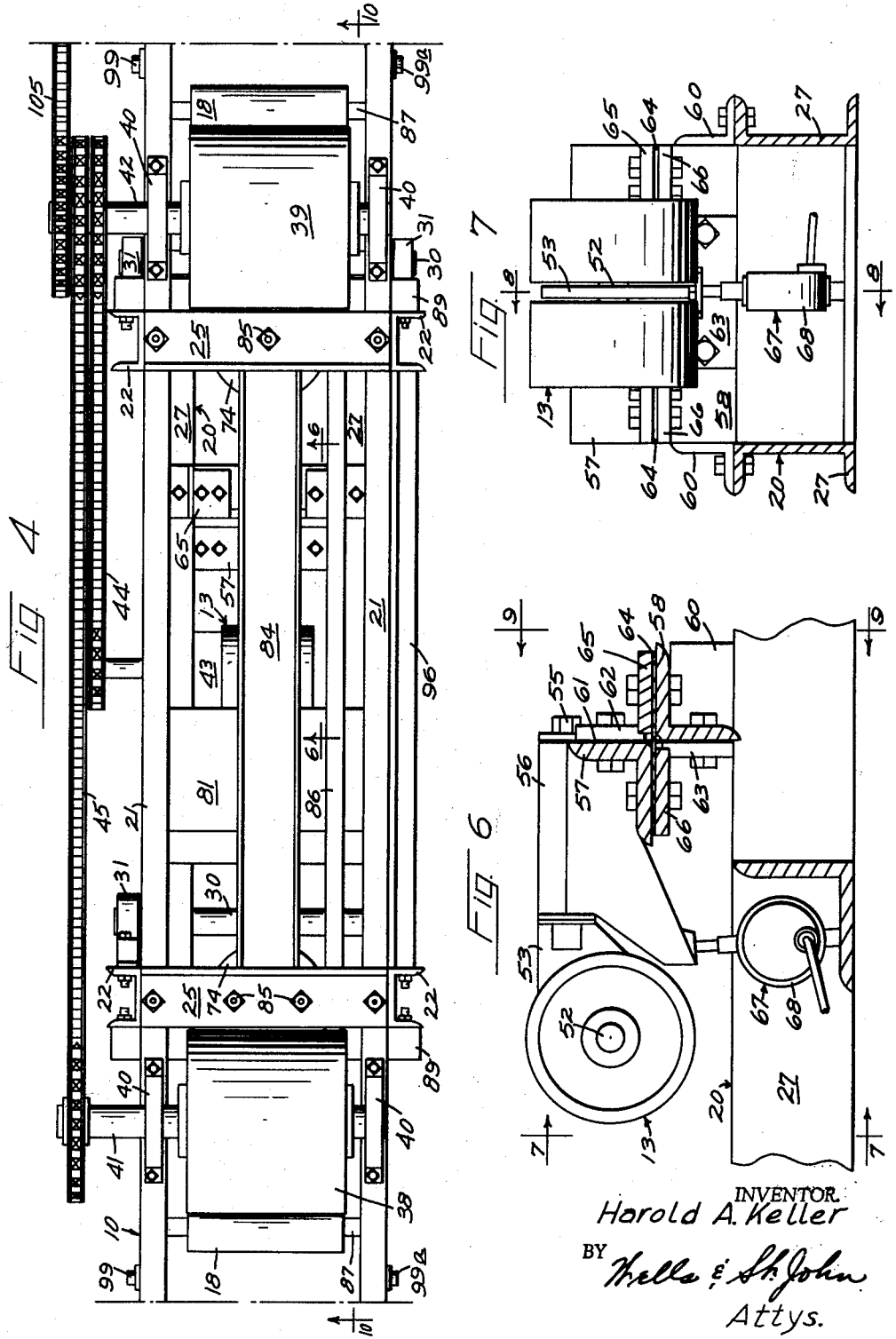

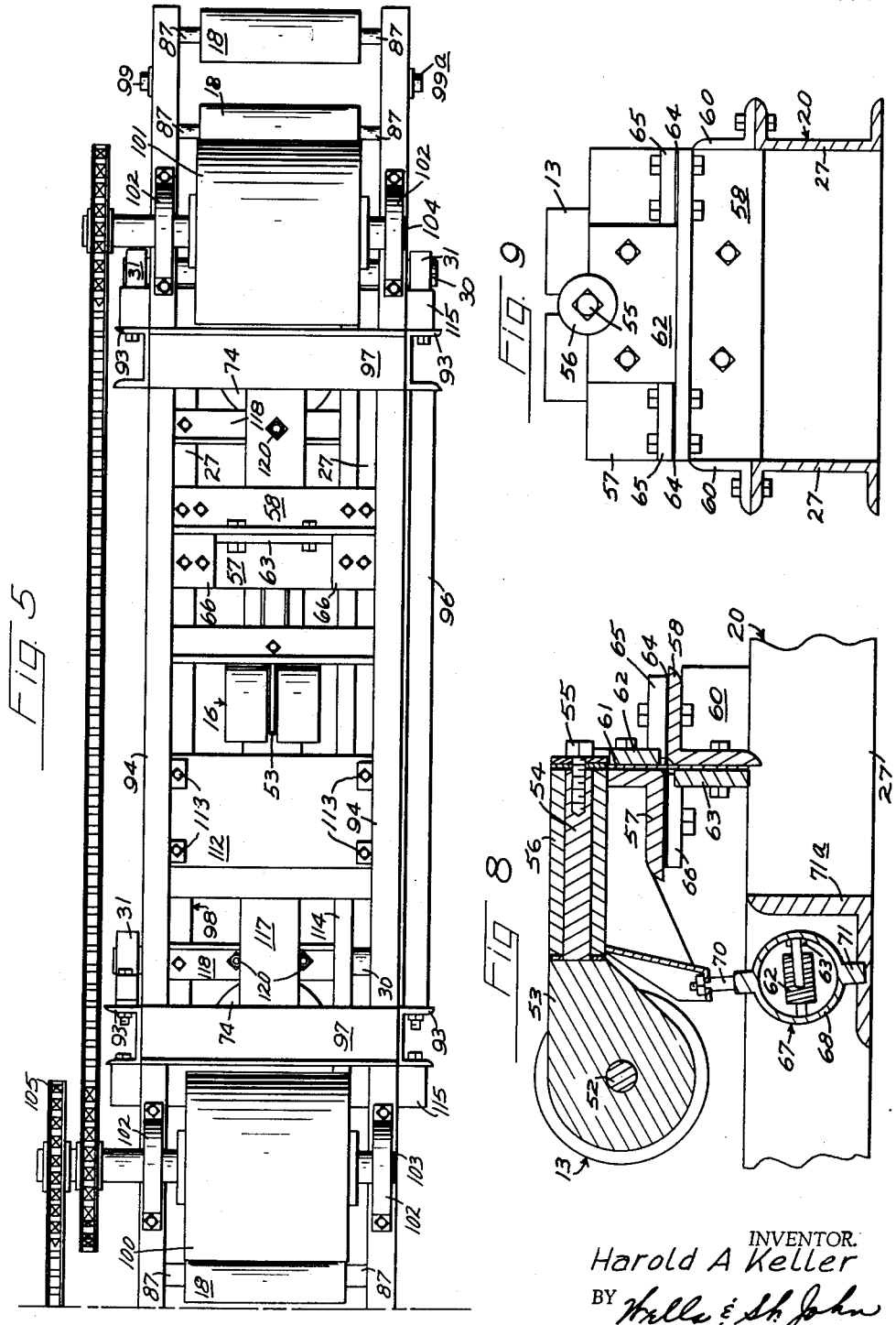

July 27, 1965

H. A. KELLER 3,196,672

MEANS FOR MEASURING STIFFNESS OF LUMBER

Filed July 24, 1961

INVENTOR.
Harold A. Keller
BY *Wells & St.John*
Attys.

July 27, 1965  H. A. KELLER  3,196,672
MEANS FOR MEASURING STIFFNESS OF LUMBER
Filed July 24, 1961  7 Sheets-Sheet 7
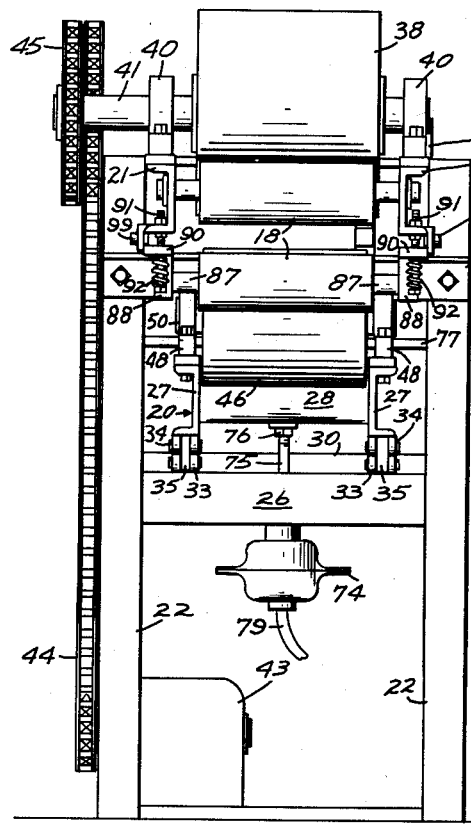
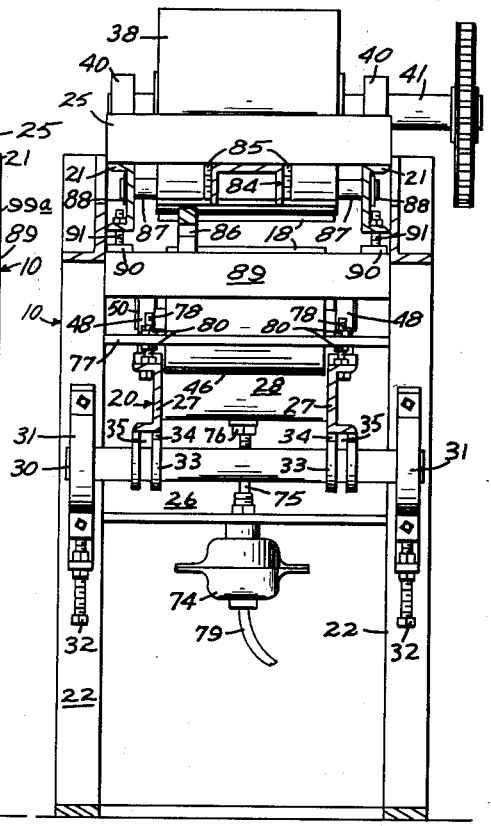
INVENTOR.
Harold A. Keller
BY
Attys.

United States Patent Office 3,196,672
Patented July 27, 1965

3,196,672
MEANS FOR MEASURING STIFFNESS OF LUMBER
Harold A. Keller, Clarkston, Wash., assignor to Potlatch Forests, Inc., Lewiston, Idaho, a corporation of Delaware
Filed July 24, 1961, Ser. No. 126,284
10 Claims. (Cl. 73—100)

This invention relates to a novel apparatus designed to effectively carry out the steps of the method.

In order to better utilize the lumber produced from a modern mill it is desirable that some indication of the strength of each board be provided. The non-uniform nature of the board makes a spot check of wood strength impractical. For this same reason any destructive test of wood strength is also inaccurate since no two pieces of a board are identical in structure. Thus it is necessary to provide a non-destructive test of each individual board as it is produced. Previous testing devices have been constructed for individual tests but are not designed for production line work. The present invention contemplates a method of measuring the stiffness of lumber. The apparatus described below is designed for high speed production work and may be effectively utilized at the output end of a modern planing machine.

It is a first object of this invention to provide a testing process and an apparatus for carrying out this process which is capable of continuous use so as to be effective at the speed required in a modern mill. In order to produce this result the boards being fed through the apparatus are continuously deflected and readings are taken periodically by electronic devices capable of extremely high speed operation.

It is another object of this invention to provide a testing apparatus which will require no manual adjustment during its use. The machine is self aligning in order to compensate for twist and warp and has adequate accommodation for slight variations in board thickness which may occur in boards being fed from a planing machine.

It is another object of this invention to provide a machine which has few moving parts. The machine utilizes driving rollers but the pivotal parts of the machine which produce the desired deflection are fixed relative to one another so as to provide uniform deflection in every board. Thus the results of tests run through this machine may be correlated with described laboratory procedures in order to accurately judge the efficiency of this testing mechanism. The uniformity of this testing procedure is most important.

These and further objects of this invention will be evident from a study of the following detailed description taken in conjunction with the accompanying drawings which illustrate a preferred form of the apparatus designed to carry out this invention. It is to be understood that this apparatus is merely one example of a physical embodiment that can be utilized in the present invention. For this reason the machine shown in the drawings is not intended to limit or restrict the scope of the invention except as that scope is defined in the claims which follow.

In the drawings:

FIGURE 1 is a diagrammatic view of the mechanical machinery and a schematic wiring diagram of the electronic components designed to yield the desired testing result;

FIGURE 2 is a side elevation view of the left hand side of the machine;

FIGURE 3 is a side elevation view of the right hand portion of the machine;

FIGURE 4 is a top view of that portion of the machine shown in FIGURE 2;

FIGURE 5 is a top view of that portion of the machine shown in FIGURE 3;

FIGURE 6 is an enlarged view of the deflection roll assembly as seen along line 6—6 in FIGURE 4;

FIGURE 7 is a view of the deflection roll assembly as seen along line 7—7 in FIGURE 6;

FIGURE 8 is a section view taken along line 8—8 in FIGURE 7;

FIGURE 9 is an end view of the deflection roll assembly as seen along line 9—9 in FIGURE 6;

FIGURE 11 is an end view of the machine as seen along the left hand end of FIGURE 2; and FIGURE 12 is a sectional view taken along line 12—12 in FIGURE 2.

Figure 10:
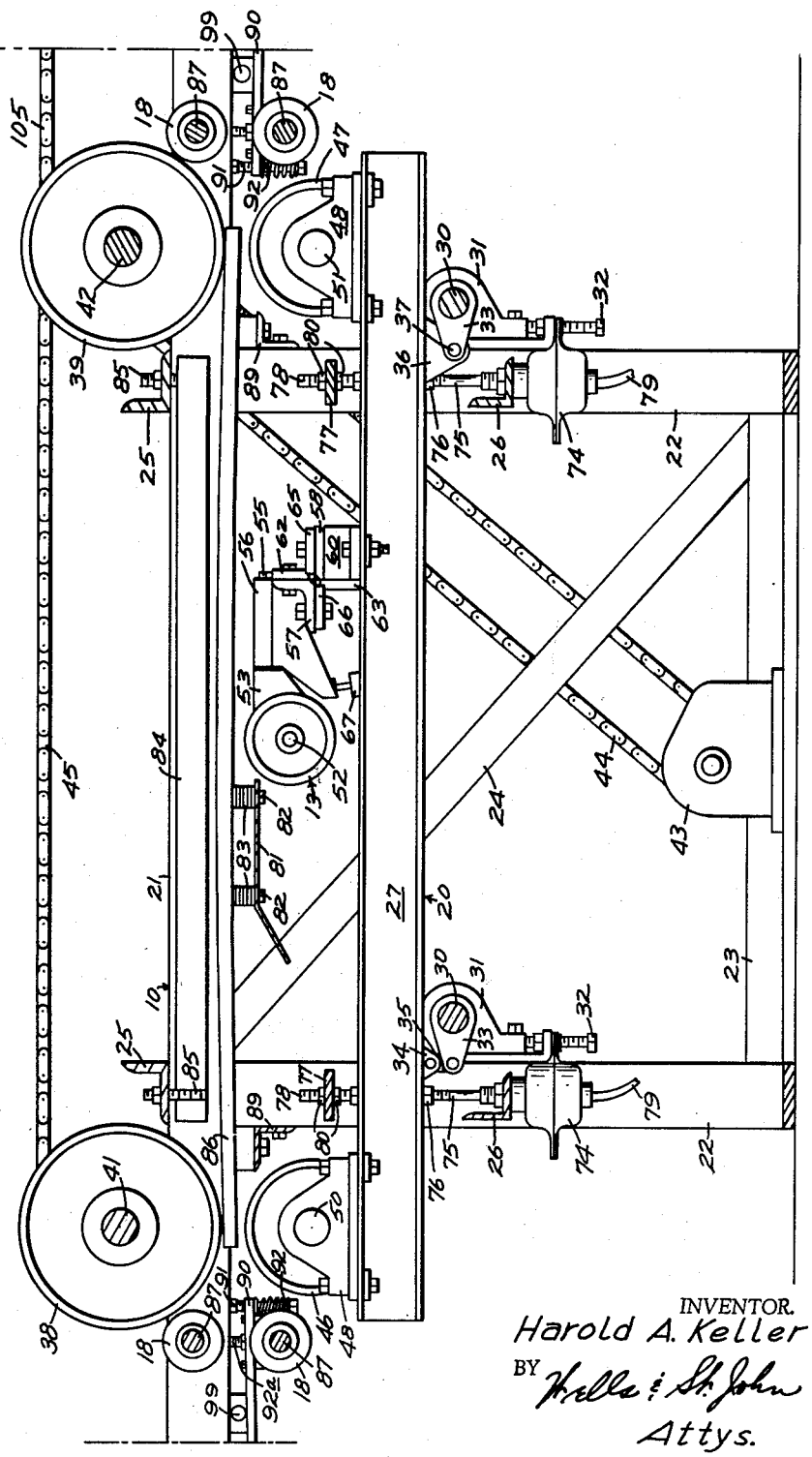
FIGURE 10 is a vertical section view taken along line 10—10 in FIGURE 4.

The basic method with which this description is concerned is quite simple. Since the testing procedure is designed specifically for use at the output of a high speed planing unit, the testing method must be continuous and capable of high speed resolution. This is accomplished by utilizing the longitudinal movement of the boards without interruption. As the boards move longitudinally along their lengths in a continuation of the movement through the planing mill, they are bent in two vertical directions along the testing unit. Actually each portion of the board is first deflected in one direction and then in the other as it traverses the testing apparatus. This opposed deflection removes the effect of bow and warp in the boards. It also eliminates any effect of board weight on the final strength determination. As the boards are deflected the force required for the fixed deflection is registered by a force cell associated with each deflection unit. These cells are electronically monitored periodically to register the force necessary to produce the fixed deflection. The force indications are then analyzed electronically and are averaged to produce the final stiffness indicator. This indicator can then be utilized to automatically operate a grading stamper or may be utilized to merely produce a visual indicator for the operator of the machine. The means by which the final indication is utilized are unimportant to the instant invention, which is primarily concerned with the mechanical aspects of the testing device.

The basic mechanical apparatus is shown diagrammatically in FIGURE 1. The entire apparatus is mounted on a fixed framework 10. The framework 10 is positioned longitudinally at the output end of a planing unit (not shown). Thus a board emerging from the planing unit will be fed directly into the apparatus mounted in the framework. 10. The framework 10 mounts a first pair of fixed rollers 38-39. These rollers are powered rollers and are mounted on framework 10 about fixed transverse rotational axes. Directly below the first pair of rollers 38-39 is a second pair of rollers 46-47. The rollers 46-47 are mounted on a movable frame 20 which is carried by framework 10 and which is biased upwardly as seen in FIGURE 1, so as to urge the second pair of rollers 46-47 toward the first pair of rollers 38-39. In this manner boards 11 passing through the apparatus will be engaged tangentially by rollers 38-39 and 46-47 at two longitudinally spaced positions. Intermediate these positions is a first deflection roll 13 which is mounted on the frame 20 intermediate the axes of the second pair of rollers 46-47. The upper periphery of this first deflection roll 13 is positioned at an elevation above that of the lines of contact of board 11 with the second pair of rollers 46-47. Any deviation in elevation between the first deflection roll 13 and the second pair of rollers 46-47 is substantially fixed and constitutes the fixed amount of deflection required to carry out the method of testing.

Directly to the right of this mechanism is a second deflection unit designed to deflect the board in an opposite direction to that created by the first deflection roll 13. This unit utilizes a third pair of rollers 100–101 which are longitudinally aligned with the first pair of rollers 38–39 and which are mounted on the framework 10 about fixed transverse rotational axes. The third pair of rollers 100–101 are backed up by a fourth pair of rollers 106–107. These last named rollers 106–107 are spring biased toward the third pair of rollers 100–101 so that the board 11 is again contacted at two longitudinally spaced positions. Intermediate the axes of the third pair of rollers 100–101 is a second deflection roll 16. The roll 16 is mounted directly on the framework 10 at a fixed elevation relative to the third pair of rollers 100–101. Thus the board 11 is first deflected a fixed amount by the roll 13 and is subsequently deflected the same amount by roll 16. The arrangement utilizes additional rollers 17 which are identical to those in the four pairs of rollers just described. Thus each group of rollers is identical and consists of two large rollers with intermediate small subsidiary rollers 18.

The grouped rollers are provided to minimize the effects of outside forces on the readings of the deflection rolls 13, 16. If all boards were perfectly straight, the additional rollers 17, 18 of the infeed and outfeed ends would be unnecessary, as the effect of end forces from a planer, etc., would be identical for each board and could therefore be eliminated from the final determination. In any event, the middle group would still be necessary, since they must minimize the effect reflected to the first deflection roll 13 due to the leading end of boards striking the guides and rolls of the second bending unit. This would not be balanced by the opposite effect reflected to the second deflection roll 16 due to the trailing end of the board passing through the first bending unit. Due to the warped nature of boards, such isolation is required also at the infeed and outfeed ends of the overall assembly. These isolation roller assemblies must cancel one another in overall effect.

As illustrated in FIGURE 1, the bending effect desired is that of a simple beam with free ends. For this reason, the subsidiary rollers 18 and additional rollers 17 must be located so as to contact the board 11 along lines tangent to the board surfaces at the adjacent supporting rollers 38, 46 and 101, 107. This same tangential relationship is utilized in positioning the center group of rollers 18 between the supporting rollers 39, 47 and 100, 106. With this arrangement, the isolating rollers 18 do not affect the loading of a perfect board from a simple beam. The effects of a warped board passing between rollers 18 is cancelled by its passage through the remaining isolating sections.

For convenience of description the apparatus has been split into two units. These two units are integrally formed on the basic framework 10 and may be joined in any suitable manner as desired. The additional support rollers 17 have been eliminated from the detailed drawings in order to conserve space. It is to be understood that each group of rollers consists of two large rollers and two intermediate subsidiary rollers 18 arranged tangentially to the bending of a simple beam. Since these roller assemblies are identical at each location along framework 10, the partial showing evidenced in the drawings is deemed sufficient. The left hand unit, which will first be described, is shown in FIGURES 2, 4, 10, 11 and 12. This unit has the basic fixed framework 10 which includes a pair of longitudinal channels 21, spaced along the sides of the unit. The longitudinal channels 21 are common to both deflection units and constitute the main portion of the framework 10. This framework is supported by upright channels 22 which rest on the supporting floor surface. The lower ends of the channels 22 are joined by bottom angle braces 23. The top ends of the upright channels 22 are joined by top cross braces 25.

The channels 22 are further joined by transverse intermediate cross braces 26 and diagonal braces 24. Thus the framework 10 for the left hand unit consists of a rectangular rigid box frame.

Mounted within the confines of the framework 10 is a first movable frame 20. This movable frame 20 consists of a pair of side support channels 27 which are positioned parallel to the longitudinal channel 21 and which are located within the area bounded by the upright channels 22. The channels 27 are joined by transverse tubes 28 to complete a rigid, rectangular frame. This frame 20 is mounted for vertical motion relative to framework 10. This is accomplished by means of transverse support shafts 30 which are mounted on the upright channels 22 by means of vertically adjustable bearing assemblies 31. The bearing assemblies 31 may be varied in height by adjustment of screws 32. Fixed to the support shafts 30 are crank arms 33. The crank arms 33 extend outwardly from the axes of shafts 30 and are designed to guide the movement of frame 20. At the left hand side, as seen in FIGURE 10, the crank arms 33 are joined to ears 34 formed on the lower surface of the support channels 27 by means of connecting links 35. At the right hand side of this figure the crank arms 33 are joined to enlarged ears 36, also formed on the lower surfaces of channels 27, by means of a connecting pin 37. The linkage just described provides a parallelogram support for the frame 20 with play included so as to prevent binding of the guide mechanism during movement of frame 20.

The framework 10 is provided with a first pair of longitudinally spaced rollers 38–39. Each of these rollers 38–39 is a hollow cylinder of normal construction which may be fabricated from steel or other suitable material. The rollers 38–39 are supported rotatably by shafts 41 and 42 respectively, which are mounted in bearing assemblies 40, secured to the upper flanges of the longitudinal channels 21. The rollers 38–39 are rotated by means of a driving apparatus 43 set at the ground level. The driving apparatus 43 is connected by means of a driving chain 44 to a sprocket fixed to the shaft 42. The shaft 42 is provided with a second sprocket over which is entrained a connecting chain 45 which rotatably connects the shaft 41 to the left. Thus the rollers 38 and 39 will be rotated in unison in the same direction by means of the single driving apparatus 43.

In order that the boards being tested may be held under pressure against the peripheries of rollers 38 and 39, a second pair of rollers 46–47 is provided in conjunction with the first pair of rollers 38–39. The rollers 46–47 are mounted with their central axes opposed to the axes of rollers 38, 39 in a line perpendicular to the board surfaces supported thereby. The structure of rollers 46–47 is identical to that of rollers 38–39 with the exception that the rollers 46–47 may be of slightly smaller outside diameter. Rollers 46–47 are mounted on support shafts 50–51 respectively which are carried by bearing assemblies 48 fixed to the upper flanges of the support channels 27 in frame 20. Being fixed to frame 20 the rollers 46–47 are vertically adjustable relative to framework 10 and therefore relative to the first pair of rollers 38–39.

In order to attain accurate results in the determination of lumber stiffness, it is necessary that there be a fixed relation between the test conducted on each board. According to the present invention, in order to utilize high speed machinery, the fixed factor is the amount of deflection along a given length of board. With this factor being held at a constant quantity by the apparatus, the only variable is the amount of force required to effect such deflection. The first unit, which is above described, utilizes a first deflection roll 13 which is adapted to contact the underside of the board, as seen in FIGURE 1. The deflection roll 13 is preferably a metal cylinder mounted on a support shaft 52 for rotation about a transverse axis. The support shaft 52 in turn is rotatably carried by a support 53. The support 53 terminates in a longitudinal pivotal shaft 54 which is rotatably journalled by a force arm 56. The shaft 54 is held in place on arm 56 by means of a locking screw 55. The roll 13 is therefore rotatable first about its own central axis so as to move with the board. It is also rotatable about the central axis of shaft 54 which is aligned with the direction of movement of the board being tested. This last motion is provided so that the roll 13 may be self aligning with the surface of the board so as to minimize the effect of twist, warpage and board surface irregularities.

The mounting of the deflection roll 13 on the frame 20 is very critical since the roll 13 must be accurately placed in order to insure proper deflection of the board. The mounting bracket can best be seen in detail in FIGURES 6 through 9. It includes a transverse angle iron 57 which is fixed to the rear edge of the force arm 56. A similar transverse angle iron 58 is mounted between the channels 27 on the frame 20 by means of two angular end mounts 60. Connecting the two angle irons 57 and 58 are three flat strips of spring steel. The central vertical strip 61 is held against the outside vertical surfaces of the angle irons 57 and 58 by means of locking plates 62 and 63. These plates 62 and 63 are merely rectangular plates having recesses adapted to receive the very thin strip 61. Two horizontal spring strips 64 flank the central strip 61 in order to increase the resistance to rotation about a vertical axis. The strips 64 are held in place by similar locking plates 65 and 66 mounted on the outside horizontal surfaces of the angle irons 57 and 58 respectively. Thus a fulcrum is provided for the force arm 56 which is extremely stable but which will allow vertical motion of the roll 13 in a limited degree.

The positioning of the force roll 13 is maintained by means of a force cell 67. The particular force cell utilized is commercially available and is manufactured by The Wiancko Engineering Company, 255 N. Halstead, Pasadena, California. The force cell 67, illustrated in the drawings, is designated as, Wiancko type F 1050, and is described as a "force pick-up." Other types of force measuring devices may be utilized, although this particular device is well adapted to the instant apparatus. The force cell 67 includes a vertical ring 68 which is quite rigid. Thus the force cell 67 may be thought of as an extremely stiff spring with electronic means for measuring its deflection. These means include a coil 62 and a movable core 63 which are respectively attached to the two diametrical inside bosses of ring 68. The ring 68 is connected by a top boss connection 70 to the front nose of the force arm 67, as seen in FIGURE 8. The lower boss connection 71 of ring 68 is directly connected to a cross member 71a rigidly fixed between the support channels 27 on frame 20. The amount of deflection necessary to produce the maximum recordable force of this unit is .005 inch. Thus it can be seen that the variation in the board deflection between zero load and maximum load will be so small as to be negligible. For purposes of this discussion the position of the first deflection roll 13 may be taken as substantially fixed relative to the second pair of rollers 46 and 47 so that the deflection of the board may be considered a constant.

The frame 20 is urged upwardly to thereby move the second pair of rollers 46–47 toward the first pair of rollers 38–39 by means of two diaphragms 74. The diaphragms 74 are mounted at each end of the frame 20 on the underside of the intermediate cross braces 26. The diaphragms 74 are conventional and have actuating rods 75 which can be moved vertically in response to air pressure supplied through hoses 79 to the underside of the diaphragm assemblies 74. By regulating the air pressure through hoses 79 one may regulate the pressure exerted by the rollers 46 and 47 upon a board backed by rollers 38 and 39. The actuating rods 75 are fixed to the cross tubes 28 of frame 20 by means of locking nuts 76. The amount of movement possible by frame 20 is limited by limit bars 77, rigidly mounted on the upright channels 22 (see FIGURE 10). These limit bars 77 are provided with bolts 78 which can be adjusted by means of locking nuts 80 so as to abut the top surfaces of the channels 27 in frame 20 and thereby limit upward movement of the frame 20. The upper limit of movement of frame 20 should be such that the rollers 46–47 are separated from rollers 38–39 by a distance slightly less than the thickness of the boards being tested. This separation must be changed for each thickness of board being tested. However, since the instant machine is designed for operation under production procedures wherein large quantities of a single thickness of board will be processed, such adjustments will not be required except at infrequent intervals.

Since the boards travelling through this unit are deflected, they must be guided between the various rollers so as to eliminate shock loading of the rollers and their respective bearings by impact of the boards against the roller surfaces and to minimize the effect of such impact on preceding elements. This is accomplished first by means of a horizontal guide plate 81, mounted just forward of the first deflection roll 13. The guide plate 81 is fixed to the lower flanges of longitudinal channels 21 by means of mounting screws 82 and variable shims 83. The top surface of the guide plate 81 should be positioned just slightly below the top peripheral surface of the deflection roll 13. Thus incoming boards will be guided across the top of roll 13 in a tangential relationship and will not jar the roll 13 and thereby possibly damage the fulcrum or force cell 67 due to shock loading.

The board, after being deflected, will tend to continue upwardly past the roll 13. In order to minimize this effect a top guide plate 84 is provided. The guide plate 84 is actually an inverted channel fixed to the top cross braces 25 by means of mounting bolts 85. The plate 84 extends substantially between the two rollers 38–39 and serve to deflect the board downwardly so as to enter between the second rollers 39 and 47 with minimum shock.

It is also important to the efficiency of this testing apparatus that the boards be properly centered on the deflection roll 13. The boards to be tested should be positioned accurately on roll 13 so as to allow the roll 13 to pivot about its central pivotal shaft 54 and thereby balance out the twist or surface irregularities which might occur on the lower board surface. This lateral positioning of the board is accomplished by means of a longitudinal lead bar 86. The length of lead bar 86 is slightly greater than the axial distance between the rollers 38 and 39. Thus the board is guided throughout the entire length where its deflection is being measured. In order to provide such a guide without disturbing the testing procedure it is necessary that the lead bar 86 be slightly bowed in a longitudinal direction as seen in a vertical view such as FIGURE 10. The thickness of the lead bar 86 in a vertical direction must be less than the thickness of the boards to be tested so that the lead bar 86 is never contacted by any of the rolls or the first deflection roll 13. The lead bar 86 is mounted across two transverse angle braces 89 which are secured to the upright channels 22. At each end of the two testing units is provided a series of subsidiary rollers 18. The axial positions of rollers 18 are inclined longitudinally so as to tangentially contact the boards being tested in a simple beam configuration. The rollers 18 are mounted on support shafts 87 which are rotatably carried by outside bearings 88. The rollers 18 are positioned on a mounting plate 90 which is carried by support bolts 91 and which is spring biased in an upward direction by compression springs 92. Motion of plate 90 is limited by adjustable stops 92a. Thus the rollers 18 will serve to minimize transmission of outside forces to the area being tested. Thus weaknesses in a board in an area other than that being tested will not invalidate the strength determination of the board in the length which is being tested. Mounted between the two sets of subsidiary rollers 18 are conventional photoelectric cells 99 and lamps 99a. These units 99 and 99a are positioned so as to receive the boards between them and thereby block the light connection from the lamp 99a to the cell 99.

The mechanical operation of this unit is quite simple and should be evident from the above description. Boards being fed between the first rollers 38 and 46 will be guided initially by the horizontal guide plate 81 and will be positioned tangentially over the first deflection roll 13. The successive motion of the board will carry it against the top guide plate 84 and eventually through the second rollers 39–47. The lateral positioning of the board will be maintained adjacent the lead bar 86. In order to insure that the board does remain against the lead bar 86, it is advisable that the rollers 38–39 be offset slightly from the perpendicular lateral position. This slight offset is not discernible from the drawings but is a conventional method of retaining boards against a lateral side edge. The board is then fully deflected after it has been engaged by the four rollers 38–39 and 46–47 as well as the first deflection roll 13. At this time force readings may be taken from the force cell 67 in any desired manner. The particular manner in which these readings are taken will be described below. The pressure exerted by the second pair of rollers 46–47 should be sufficient to insure complete transverse contact of all four rolls with the board as it is being tested. This pressure eliminates the unwanted effects of board twist or bowing. For conventional lumber products it is intended that the overall test length be approximately five to six feet and that the deflection provided by the first roll 13 be approximately five-sixteenths of one inch.

The second testing unit is shown in FIGURES 3 and 5. This unit is very similar to that described above and where the parts of the unit remain unchanged identical numerals will be utilized to designate these parts in the drawings. The frame of the second unit is a continuation of framework 10 and includes the longitudinal channels 21. Thus a common frame member 21 is provided on each side of both testing units. The channels 21 are supported by upright channels 93 which are taller than the previously described upright channels 22. This additional height is required to accommodate the upper positioning of the force roll in this unit so as to contact the upper surface of the board being tested. The upright channels 93 support a pair of longitudinal top channels 94 which are located above the longitudinal channels 21. The lower ends of the upright channels 93 are fixed to bottom angle braces 95 to again complete a rectangular box frame. The upright channels 93 are braced by diagonal braces 96 to add rigidity to this frame. Top cross braces 97 are provided across the upper ends of the upright channels 93. The remaining portions of this fixed framework are identical to that in the left hand unit previously described. The second unit is also provided with a movable frame 98 which is substantially identical to that frame 20 previously described.

Mounted along the horizontal channel 21 is a third pair of large rollers 100–101. These rollers correspond to the previously described rollers 38–39. Rollers 100–101 are supported by bearings 102 fixed to the top flanges of channels 21. Bearings 102 support shafts 103 and 104 which respectively mount the rollers 100 and 101 slightly below the level of rollers 38–39. The shafts 103–104 are driven by a chain 105 which is connected to a sprocket fixed to the shaft 42. Thus the four upper rollers 38–39, 100–101 are drivingly connected by a common driving apparatus 43 and are rotated in unison to insure proper movement of the board along the longitudinal length of the testing machine.

Frame 98 is provided with a fourth pair of rollers 106–107 whose axes are opposed to the axes of rollers 100–101 perpendicular to the contacted board surfaces. Rollers 106–107 correspond to the second pair of rollers 46–47 in the previously described unit. They are rotatably supported by bearings 108 mounted on the channels 27 of the frame 98. Bearings 108 rotatably carry support shafts 109–110 which respectively mount the rollers 106–107.

The second unit is provided with a second deflection roll 16 which is carried by a mounting apparatus identical to that described in the previous unit. The only difference between this present arrangement and that above described is that the roll 16 and its mounting apparatus are inverted from the position illustrated in the earlier figures. The roll 16 is carried by the fixed framework 10 and is specifically mounted on the upper longitudinal channels 94. The roll 16 is provided with a force cell 111 identical in all respects to the force cell 67.

The frame 98 is biased upwardly in the same manner as is frame 20 by means of air diaphragm motors 74. No change is required in this portion of the apparatus.

Since the boards will be deflected oppositely in this unit to that deflection previously described the corresponding guide members must also be inverted from the positions described in the left hand unit. Thus the present unit is provided with an inverted horizontal guide plate 112 which is fixed between the channels 21. The lower surface of the guide plate 112 should be slightly above the lowest peripheral surface of the second deflection roll 16. The guide plate 112 is mounted by bolts 113 to a projection fixed to the inside surfaces of the channels 21.

The lead bar 114 in this unit is also inverted from the position shown in the earlier unit. It is mounted across braces 115 fixed to the upright channels 93. The lead bar is fixed by mounting bolts 116. Lead bar 114 must be bowed longitudinally downward at a central area so as to provide clearance for the self aligning deflection roll 16.

Since deflection is in a downward direction it is necessary to provide a lower guide plate 117 which corresponds to the guide plate 84, previously described. Again the plate 117 is actually an inverted channel and is adjustably mounted on bolts 120 supported by cross braces 118 mounted on the frame 98. The positioning of the guide plate 117 will therefore be insured relative to the lower pair of rollers 106–107 so as to prevent damage to the bearings 108 by shock loading against the outer surface of the second roller 107.

The operation of this unit is merely the inverse of the previous unit. The second deflection roll 16 is substantially fixed relative to the fixed rollers 100–101. The two units should have identical dimensions so that the deflection in one direction will be identical to the deflection in the opposite direction. Thus by deflecting the board in two different directions all effects of board weight and longitudinal bowing will be eliminated.

The basic principle of testing in this apparatus is to provide automatic measurement of the force required to produce the fixed deflection. The boards are assumed to be of standard dimensions at the out-feed end of a planer. The machine must be manually reset for each change of cross section thickness. The variations in the normal product from standard cross section will not affect the stiffness value as indicated by the instant machine. Such variation would effect the measurement of the modulus of elasticity and should such measurements be desired, automatic measurement of thickness and width would be required. As is necessary in all measurements of bending stress and strain in lumber the effect of non-homogeneity of the material along its length must be neglected. The present machine has been demonstrated to yield practical results.

The present machine applies a single concentrated load to produce a fixed amount of deflection along a given length of board between the end supporting rolls. The reaction from this fixed deflection would yield a triangular bending moment diagram. By moving the board the result is similar to a trapezoidal diagram of a two point concentrated load with constant bending moment between the loads. In order to provide an accurate determination of the board stiffness and therefore the board strength, it is necessary to periodically record the force exerted on the two deflection rolls 13 and 16. The monitoring of this force is accomplished by a general electronic scheme illustrated in FIGURE 1. It is to be understood that this scheme is merely a generalized showing and is not intended to limit the present invention to any particular components. Obviously the force may be monitored manually or by other automatic systems as may be desired in any particular installation.

The Wiancko type F 1050 force pick up utilized as the force cells 67 and 111 has been previously described. These pick ups are wired to the input connection of a suitable high frequency oscillator 121 which are shown in FIGURE 1, and which are individually connected to the two force cells 67 and 111. The oscillators 121 are adapted to produce oscillations between 10,000 c.p.s. and 12,500 c.p.s. The output frequency of the oscillators 121 will be determined by the positioning of the core and coil in the respective force cell. The output of the oscillators 121 are monitored by counters 122 of standard design. The two counters are designated by the numerals 122. The counters 122 are actuated by means of the photoelectric cells 99. Thus the left hand counter 122 is connected to the left cell 99 and also to the center cell 99. The right hand counter 122 is connected to the center cell 99 and the right hand cell 99. The cell 99 at the right of each unit initiates the counter 122 for that unit so that force readings will be taken during the interval in which the board traverses the rolls of that unit. The cell 99 at the left of each unit terminates this counting procedure by turning off the counter 122 for that unit. The electronic components can have a very rapid resolution so that boards passing in quick succession will automatically turn the counters 122 on and off so that the readings from one board will not be confused with those of the next. The two counters 122 are wired to a unit 123 which analyzes the readings from the counters 122 and averages the force determination to produce an output signal to one of several sets of output terminals 124. A typical analyzer 123 would be a digital comparator such as those produced in the 3180 series by the Berkeley Division of Beckman Instrument Incorporated, 2200 Wright Ave., Richmond, California. This comparator scans the readings of the two counters 122 until an average level is found. When this level has been ascertained it will actuate the suitable output 124 to thereby control the output apparatus. The terminals 124 may produce visual signals or may be utilized to control an automatic stamping apparatus designed to grade each piece of lumber as it emerges from this testing unit. The terminals 124 could also be utilized to control an automatic sorting device to sort the boards according to their stiffness.

Thus it can be seen that the present invention contemplates an automatic high speed testing device for determining the stiffness of lumber according to the novel method described at the beginning of this specification. It should be obvious that modifications in the mechanical parts described specifically above may be made without deviating from the broad scope of this invention. For this reason only the following claims are intended to define my invention.

Having thus described my invention, I claim:

1. An apparatus for determining the stiffness of a wooden board moving parallel to its length in a longitudinal direction comprising:
   a supporting framework;
   first, second and third support means mounted on said framework in successive aligned longitudinally spaced positions, each of said support means being adapted to contact opposed board surfaces of the board along longitudinally spaced transverse lines as it moves across said support means in a longitudinal direction relative to said framework;
   first deflection means mounted on said framework for limited motion relative thereto intermediate said first and second support means adapted to contact a first of said opposed board surfaces along a transverse line intermediate the lines of contact of said first and second support means, the perpendicular distance between the plane containing the lines of contact of said first and second support means and the second of said opposed board surfaces and a parallel plane containing the line of contact of said first deflection means and the first of said opposed board surfaces being less than the board thickness measured between said opposed board surfaces;
   second deflection means mounted on said framework for limited motion relative thereto intermediate said second and third support means adapted to contact the second of said opposed board surfaces along a transverse line intermediate the lines of contact of said second and third support means, the perpendicular distance between the plane containing the lines of contact of said second and third support means and the first of said opposed board surfaces and a parallel plane containing the line of contact of said second deflection means and the second of said opposed board surfaces being less than the board thickness measured between said opposed board surfaces;
   and means operatively connected to said first and second deflection means adapted to indicate the stiffness of a board contacted thereby.

2. An apparatus for determining the stiffness of a wooden board moving parallel to its length in a longitudinal direction, comprising:
   a supporting framework;
   first, second and third support means mounted on said framework in successive aligned longitudinally spaced positions, said first and third support means being adapted to contact first and second opposed board surfaces, respectively, of the board as it moves across said support means in a longitudinal direction relative to said framework, said second support means being adapted to contact each of said first and second opposed board surfaces;
   first deflection means mounted on said framework for limited motion relative thereto intermediate said first and second support means in longitudinal alignment therewith adapted to contact the second of said opposed board surfaces, the perpendicular distance between the plane containing the lines of contact of said first and second support means and the first of said opposed board surfaces and a parallel plane containing the line of contact of said first deflection means and the second of said opposed board surfaces being less than the board thickness measured between said opposed board surfaces;
   second deflection means mounted on said framework for limited motion relative thereto intermediate said second and third support means in longitudinal alignment therewith adapted to contact the first of said opposed board surfaces, the perpendicular distance between the plane containing the lines of contact of said second and third support means and the second of said opposed board surfaces and a parallel plane containing the line of contact of said second deflection means and the first of said opposed board surfaces being less than the board thickness measured between said opposed board surfaces;
   and means operatively connected to said first and second deflection means adapted to indicate the stiffness of a board contacted thereby.

3. An apparatus for determining the stiffness of a wooden board moving parallel to its length in a longitudinal direction, comprising:
 a supporting framework;
 a first pair of longitudinally aligned rollers mounted on said framework about longitudinally spaced transverse axes;
 a second pair of longitudinally spaced rollers respectively opposed to the rollers of said first pair, the respective opposed rollers of said first and second pairs being adapted to tangentially contact opposed board surfaces of the board as it passes between them while moving in a longitudinal direction relative to the framework, the axes of said second pair of rollers being aligned with the respective axes of said opposed rollers in planes perpendicular to the contacted board surfaces;
 a deflection roll mounted on said framework conjointly with said first pair of rollers, said deflection roll being mounted transversely of the framework for limited motion relative thereto intermediate the rollers of said first pair and being adapted to tangentially contact one of said opposed board surfaces, the perpendicular distance between a plane containing the lines of contact of said second pair of rollers and the moving board and a parallel plane containing the line of contact of said deflection roll and the moving board being less than the board thickness measured between said opposed surfaces;
 lateral guide means mounted on said framework adapted to coact with the rollers of said first and second pairs to maintain the moving board in contact with said deflection roll during passage between the respective rollers of said first and second pairs;
 and means operatively connected to said deflection roll adapted to indicate the stiffness of a board passing between said first and second pair of rollers.

4. The device as defined in claim 3 wherein the rollers of one of said pairs of rollers are mounted on said framework for vertical motion relative to the rollers of the other pair of rollers, and further comprising:
 biasing means connected between said framework and the mounting of the vertically movable rollers adapted to urge said last named rollers toward the rollers of the remaining pair of rollers, the amount of force exerted by said biasing means being sufficient to normally insure full contact of each roller of both pairs across the full board width of the moving board.

5. An apparatus for determining the stiffness of wooden boards carried parallel to their lengths along a conveyor, comprising:
 a supporting framework located at the output end of the conveyor;
 a first pair of longitudinally aligned rollers mounted on said framework about fixed longitudinally spaced rotational axes, said first pair of rollers being adapted to engage moving boards along longitudinally spaced transverse lines as they emerge from the conveyor;
 a movable frame mounted within the boundaries of said framework vertically adjacent said first pair of rollers;
 means connecting said frame and said framework adapted to guide said frame for vertical motion relative to said framework;
 a second pair of rollers mounted on said frame adapted to engage the board surface opposed to that engaged by said first pair of rollers, the rollers of said second pair being respectively opposed to the rollers of said first pair with the axes of opposed rollers being located in planes perpendicular to the engaged board surfaces;
 biasing means connecting said frame and said framework adapted to urge said frame in a direction wherein said second pair of rollers are forced toward said first pair of rollers, the force exerted on said frame by said biasing means being sufficient to insure tangential contact of a board by each roller of said first and second pairs of rollers;
 a first deflection roll mounted on said frame about a transverse rotational axis positioned intermediate the axes of said second pair of rollers, said first deflection roll being located on said frame so as to contact boards passing between said first and second pair of rollers at an elevation displaced toward said first pair of rollers from a plane containing the lines of contact of said second pair of rollers and the moving boards;
 a third pair of longitudinally aligned rollers mounted on said framework about fixed longitudinally spaced rotational axes, said third pair of rollers being adapted to tangentially engage moving boards along longitudinally spaced transverse lines as they emerge from between said first and second pairs of rollers;
 a fourth pair of rollers mounted on said framework adapted to engage the board surface opposed to that engaged by said third pair of rollers, the rollers of said fourth pair being respectively opposed to the rollers of said third pair with the axes of opposed rollers being located in planes perpendicular to the engaged board surfaces;
 biasing means connecting said fourth pair of rollers and said framework adapted to urge said fourth pair of rollers toward said third pair of rollers, the force exerted on said fourth pair of rollers being sufficient to insure tangential contact of a board by each roller of said third and fourth pair of rollers;
 a second deflection roll mounted on said framework about a transverse rotational axis positioned intermediate the axes of said third pair of rollers, said second deflection roll being located on said framework so as to contact boards passing between said third and fourth pairs of rollers at an elevation displaced toward said fourth pair of rollers from a plane containing the lines of contact of said third pair of rollers and the moving boards;
 and means operatively connected to said first and second deflection rolls adapted to indicate the individual force exerted on each of said deflection rolls by the moving boards.

6. The device as defined in claim 5, wherein said first and second deflection rolls are mounted on said frame and framework respectively for pivotal motion about longitudinal axes parallel to the direction of motion of the boards.

7. The device as defined in claim 5 wherein said last named means comprises individual compressive force cells adapted to indicate compressive force amplitude, said cells being respectively mounted between said first deflection roll and the frame and between said second deflection roll and the framework.

8. An apparatus for indicating the longitudinal stiffness of a wooden board, comprising:
 a supporting framework;
 first and second support means on said framework in longitudinally spaced locations adapted to contact a first surface of a board along longitudinally spaced transverse lines during movement of the board in a longitudinal direction relative to the framework;
 deflection means mounted on said framework at a longitudinally aligned position intermediate said first and second support means, including force applying means mounted on said framework for limited movement relative thereto in a direction perpendicular to a first plane containing the lines of contact of said first and second support means and the board, said force applying means being adapted to contact a second surface of the board opposite to said first surface as the board moves in contact with said first and second support means, the perpendicular distance between said first plane and a parallel plane tangential to the area of contact of said force applying means and the board being less than the board thickness between the two contacted board surfaces;

and means on said framework operatively connected to said deflection means adapted to indicate the stiffness of the board during contact of the board by said first and second support means and said deflection means.

9. An apparatus for indicating the longitudinal stiffness of a wooden board, comprising:

a supporting framework;

first and second support means on said framework in longitudinally spaced locations, each including a pair of opposed transverse rollers adapted to tangentially contact first and second opposed surfaces of a board during movement of the board in a longitudinal direction relative to the framework;

deflection means mounted on said framework including a transverse roll located in a longitudinally aligned position intermediate said first and second support means, said deflection means including force applying means operatively connected between said framework and said roll adapted to limit motion of said roll relative to said framework in a direction perpendicular to a first plane containing the lines of contact of said first and second support means and a first of said opposed board surfaces, said roll being adapted to tangentially contact the second of said opposed board surface as the board moves relative to the framework in contact with said first and second support means, the perpendicular distance between said first plane and a parallel plane containing the tangential line of contact of said roll and the second of said board surfaces being less than the board thickness between the two opposed board surfaces;

and means on said framework operatively connected to said deflection means adapted to indicate the stiffness of the board during contact of the board by said first and second support means and said deflection means.

10. An apparatus for indicating the longitudinal stiffness of a wooden board, comprising:

a supporting framework;

a first set of transverse rollers mounted on said framework in longitudinally aligned positions adapted to tangentially contact a first surface of a board along a first plane;

a second set of transverse rollers mounted on said framework in longitudinally aligned positions directly opposed to said first set of rollers adapted to tangentially contact a second surface of the board opposed to said first surface along a second plane parallel to said first plane;

yieldable means operatively connected between said framework and one of said sets of rollers adapted to yieldably urge said one set of rollers toward the remaining set of rollers;

deflection means mounted on said framework including a transverse roll longitudinally spaced from said first and second sets of rollers in parallel alignment therewith, said deflection means including force applying means operatively connected between said framework and said roll adapted to limit motion of said roll relative to said framework in a direction perpendicular to said first and second planes, said roll being adapted to tangentially contact the board along one of said opposed board surfaces as the board moves relative to the framework in contact with said first and second sets of rollers, the perpendicular distance between said first and second planes and a parallel plane containing the line of contact of the roll and board being less than the board thickness between said first and second opposed board surfaces;

and means on said framework operatively connected to said deflection means adapted to indicate the stiffness of the board during contact of the board by said first and second sets of rollers and by said deflection means.

References Cited by the Examiner

UNITED STATES PATENTS

| | | | |
|---|---|---|---|
| 2,032,989 | 3/36 | Kenney et al. | 73—100 X |
| 2,444,245 | 6/48 | Campbell | 73—144 |
| 2,693,107 | 11/54 | Paden | 73—100 |

RICHARD C. QUEISSER, *Primary Examiner.*